United States Patent [19]

Flohn

[11] Patent Number: 4,516,446
[45] Date of Patent: May 14, 1985

[54] PRECISION ROTATING ROD GUIDE

[75] Inventor: Paul H. Flohn, East Orange, N.J.

[73] Assignee: North American Philips Lighting Corporation, New York, N.Y.

[21] Appl. No.: 465,959

[22] Filed: Feb. 14, 1983

[51] Int. Cl.³ .................. B65H 23/32; B23B 25/00
[52] U.S. Cl. .................................. 82/38 A; 226/196; 226/199
[58] Field of Search ............... 226/196, 197, 198, 199, 226/174, 176; 242/152.1, 157, 151; 82/38, 39, 35

[56] References Cited

U.S. PATENT DOCUMENTS

| | | | |
|---|---|---|---|
| 1,059,225 | 4/1913 | Sherrill | 82/39 |
| 1,284,106 | 11/1918 | Holton | 82/35 |
| 1,401,131 | 12/1921 | Blackburn | 82/39 |
| 2,114,978 | 4/1938 | Horger et al. | 82/38 X |
| 2,577,277 | 12/1951 | Schultz | 82/39 |
| 2,669,907 | 2/1954 | Miller | 82/39 X |
| 2,842,998 | 7/1958 | Kostka | . |
| 2,909,341 | 10/1959 | Kingsley | 242/151 |
| 3,225,631 | 12/1965 | Hermann | 82/39 |
| 3,320,839 | 5/1967 | Dinsmore | 82/21 R |
| 3,736,114 | 5/1973 | Okada | 51/230 |
| 3,750,499 | 8/1973 | Peasley | 82/39 |
| 4,150,772 | 4/1979 | Aver | 226/176 X |
| 4,358,068 | 11/1982 | Weiss | 242/152.1 X |

Primary Examiner—John Petrakes
Assistant Examiner—Leo J. Peters

[57] ABSTRACT

A precision rotating rod guide for damping the vibrations of an axially moving, rotating rod as it passes through a work station which comprises a pair of duplicate guide members on each side of a work station. Each of the guide members include three coacting ball casters equidistantly angularly disposed about the axis of a rod passing through the guide members thereby damping the vibrations imparted to the rotating axially moving rod at the work station.

5 Claims, 2 Drawing Figures

PRECISION ROTATING ROD GUIDE

BACKGROUND OF THE INVENTION

In the manufacture of tungsten wire for lamp filaments and the like, the tungsten is reduced through various processes from billet size to thin filament wire. The process generally includes rough swaging to reduce the billet to rod form and then more precision swaging to reduce the rod to a diameter small enough to be drawn on wire drawing machines to reduce the subsequent wire diameter to that required for the manufacture of lamp filaments. During the intermediate continuous rod swaging process, the rods are moving axially as well as rotating through the swaging machine which creates significant vibrations in the rod as it feeds toward the swaging machine. It is desirous at this point in the manufacturing process to sense and measure cracks and surface defects in the tungsten rod, which cracks and defects can have a significant effect on the quality of the finished tungsten wire. Commercial equipment for sensing the surface defects and cracks include an electromechanical coil through which the rod must axially pass and the efficiency and accuracy of commercial defect sensing equipment can be severely impaired when the rod is vibrating. Elimination, or at least the substantial dampenin of these vibrations in the rod is accordingly critical to the accurate sensing of surface cracks and defects in the rod just prior to its entering the swaging machine.

Since axial movement as well as continuous rotating movement of the rod is essential to the swaging process any mechanism for dampening the vibrations in the rod as it passes through the defect sensing device must allow for the free axial as well as rotational movement of the rod without any impairment of that motion by the dampening device.

SUMMARY OF THE INVENTION

A precision rotating rod guide has been provided in accordance with the present invention which will allow for the free axial and rotational motion of the rod while substantially eliminating those vibrations imparted to the rod by the swaging process.

In accordance with the present invention, a rotating rod guid is provided for dampening the vibrations of an axially moving rotating rod as it passes through a work station by providing a pair of spaced rotating rod guide means situated on each side of the work station. Each of the rotating rod guide means, include a support member having first and second ball casters mounted thereon in a fixed angular relationship to the axis of a rod passing through the rotating rod guide means and a third ball caster pivotally mounted to the support member which is spring urged into contact with the rod. Each of the first, second and third ball casters on each of the rotating rod guide members are angularly equidistantly spaced about the axis of the rod whereby an axially moving rotating rod passing through the pair of spaced rotating guide means will be maintained in a comparatively vibration-free condition as it passes through the work station. The first and second ball casters are directly mounted to the support member at about 60° from the vertical and the tension on the spring urging the third ball caster into contact with the rod is adjustable.

BRIEF DESCRIPTION OF THE DRAWING

Many of the attendant advantages of the present invention will become more readily apparent and better understood as the following detailed description is considered in connection with the accompanying drawings in which.

DESCRIPTION OF THE PREFERRED EMBODIMENT

Figure 1:
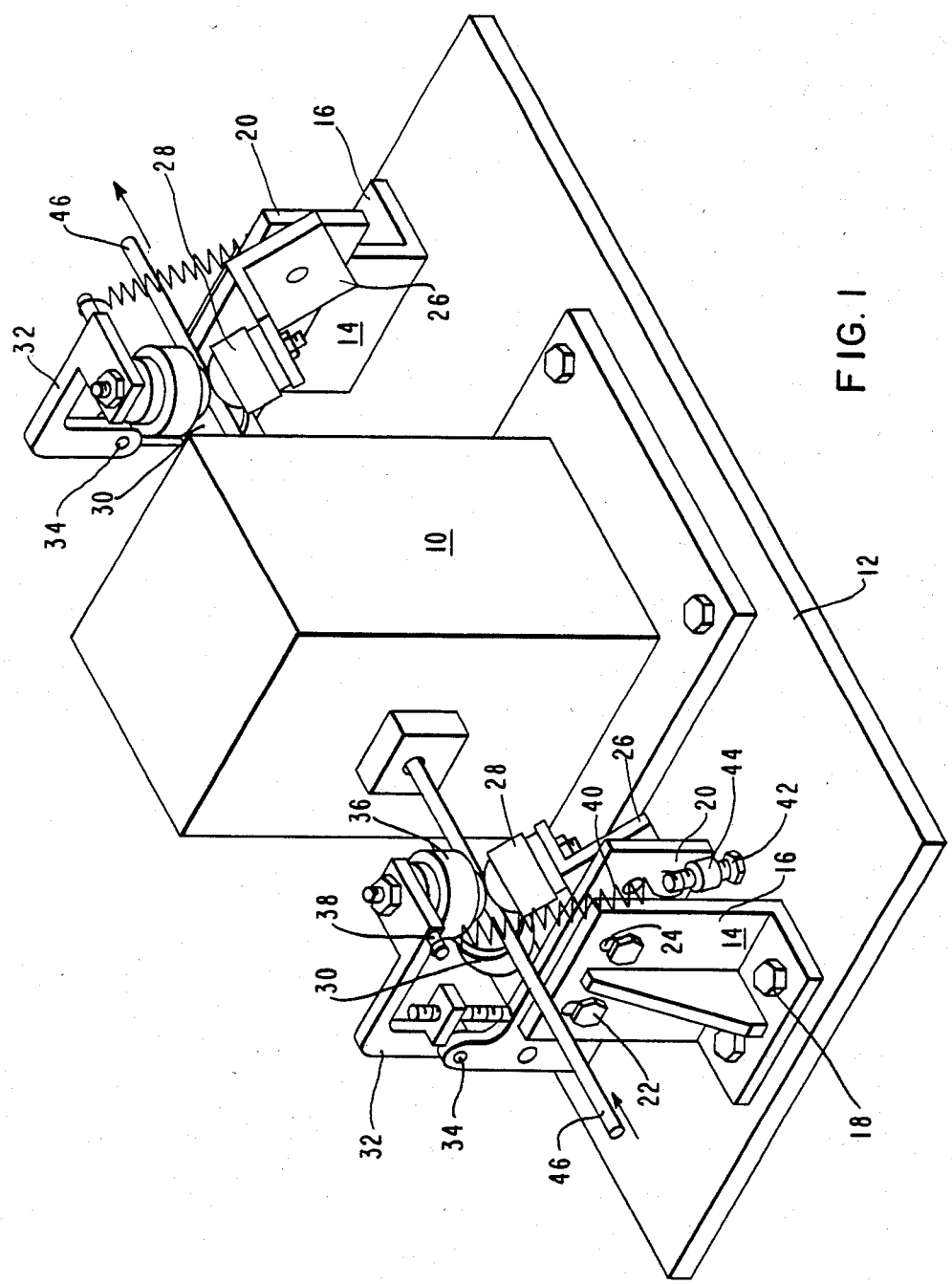
FIG. 1 is a perspective view of the precision rod guide of this invention.
Figure 2:
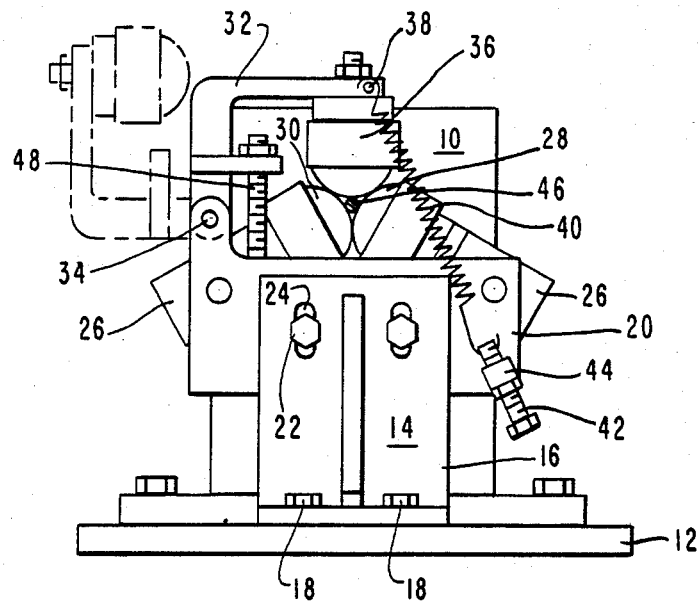
FIG. 2 is an end elevation view of one of the rod guides of this invention.

Referring now in detail to the drawing wherein like reference characters represent like parts throughout the several views, there is illustrated in FIG. 1 the precision rotating rod guide of this invention in combination with a standard commercial crack and surface defect detector generally designated 10. When tungsten rods are processed into wire for purposes of making lamp filaments, a part of that process requires that the axially moving rotating rod is passed through a swaging machine in order to reduce the diameter of the rod sufficiently that it can be subsequently drawn on wire drawing equipment. It is desirable to pass the tungsten rod through a device which includes an electromechanical coil which senses surface cracks and defects in the wire during the manufacturing process and because the swaging machine imparts considerable vibration to the traveling rod, the accuracy of the defect detecting mechanism is severely impaired.

In accordance with the present invention, these vibrations can be significantly dampened by employing on each side of the detecting device or work station 10 a unique rod guide employing ball casters. In this regard, the inspection device 10 is located centrally on a base plate 12 with a rotating rod guide structure generally designated 14 located on each side of the defect detector 10. Each of the rod guides 14 include a bracket support 16 secured to the base plate 12 by, for example, bolts 18. A mounting plate 20 is secured to the bracket support 16 by means of bolts 22 which extend through slots 24 in the bracket support. The slots 24 provide for the adjustable vertical positioning of the mounting plate 20 with respect to the base plate 12 in order to accommodate different diameter swaged rods. For example, rods having diameters of from 0.093 inches to 0.375 inches are accommodated by the current embodiment.

A pair of ball caster brackets 26 are mounted to the mounting plate 20 at angles of about 60° from the vertical and carry on their upward and inwardly projecting ends a pair of ball casters 28 and 30. Also, pivotally mounted to the mounting plate 20 is an arm 32 pivoted at one end to the mounting plate 20 at 34 and having, at its other end, a vertically oriented third ball caster 36. Adjacent to the interconnection of the ball caster 36 to the arm 32 is a projection 38 which extends laterally from the arm 32. A tension spring 40 extends between the projection 38 and an adjusting screw 42 which is fixedly mounted to the mounting plate 20 at 44. The spring 40 urges the ball caster 36 into contact with a work piece or rod 46 which rides on the ball casters 28 and 30. The adjusting screw 42 can control the pressure applied by the spring 40 urging the ball caster 36 to contact with the rod 46. The arm 32 is also provided with a limit stop 48 which coacts with the top edge of the mounting plate 20 and can be used to limit the extent of rotation of the arm 32 and hence the travel of the ball caster 36 toward the ball casters 28 and 30.

Referring now more particularly to FIG. 1, as the rod 46 proceeds in the direction of the arrows into and through an adjacent swaging machine (not shown), the rod proceeds through a first rotating rod guide, the defect detection device which includes an electromechanical coil through which the rod passes axially and, for example, may be a Defectomat Model C2.820 defect detector manufactured by the Foerester Company of West Germany and on through the second rotating rod guide and into the swaging machine. As the rod travels toward the swaging machine it is moving axially as well as rotating and none of these relative motions can be impaired by the guide. In this regard, the rod 46 rides upon the fixed ball casters 28 and 30 and has essentially point contact with the ball casters while the ball caster 36 rides on the top of the rod with a third point contact and is urged against the rod and hence the rod into point contact with the other casters 28 and 30 through the force applied by the spring 40. As will be apparent, since ball casters are free to rotate in any direction, there is no impediment to the rotational or axial movement of the rod by the contact with the ball casters and the portion of the rod between the first rotating rod guide and the second rotating rod guide which passes through the defect detector 10 is substantially free from vibration which has been imparted to the rod by the swaging machine.

Although the invention has been disclosed with respect to the manufacture of tungsten wire for making lamp filaments, it will be apparent that the concept of maintaining a rod of any type which has imparted thereto both rotational and axial movement in a fixed position without excessive hindering of that motion can be uniquely accommodated by the three ball casters spaced approximately 120° from each other and providing point contact with the moving rod in three locations which are equidistantly spaced about the circumference of the rod.

I claim:

1. A rod guide and sensor assembly, comprising:
   a sensor for sensing a longitudinally traveling rod traveling relative to said sensor and proximate said sensor; and
   a pair of rod guides positioned on opposite sides of said sensor for defining a path of travel for a longitudinally traveling rod and for guiding a longitudinally traveling rod along the path of travel relative to and proximate said sensor, each of said rod guides comprising;
   three spherical bearings symmetrically disposed around the rod travel path defined by said pair of rod guides for guiding a rod traveling longitudinally along the rod travel path;
   bearing mounting means for mounting said three spherical bearings for rotation about their respective centers at their respective symmetrically disposed positions to permit a longitudinally traveling rod guided by said spherical bearings of said rod guides to rotate freely; and
   biasing means for biasing one of said spherical bearings toward the other of said spherical bearings for maintaining a portion of longitudinally traveling rod between and guided by said pair of rod guides sufficiently vibration-free to permit said sensor to accurately sense the portion of rod proximate said sensor while permitting the longitudinally traveling rod to rotate freely.

2. A rod guide and sensor assembly according to claim 1, wherein said three spherical bearings and said bearing mounting means together comprise three bearing casters, a support having two of said bearing casters symmetrically mounted thereon, a pivot arm having a free end pivotable toward and away from said two of said bearing casters mounted on said support, and the third of said bearing casters mounted on the free end of said pivot arm for movement toward said two of said bearing casters.

3. A rod guide and sensor assembly according to claim 2, wherein said pivot arm is mounted on said support.

4. A rod guide and sensor assembly according to claim 2, wherein said biasing means is a spring biasing said pivot arm to pivot to move said pivot arm free end toward said two of said bearing casters mounted on said support.

5. A rod guide and sensor assembly according to claim 1, wherein said sensor is a sensor coil having an axis oriented parallel to the rod travel path defined by said pair of rod guides and said rod guides maintain a longitudinally traveling rod parallel to the coil axis.

* * * * *